United States Patent [19]
Gupta et al.

[11] Patent Number: 5,949,888
[45] Date of Patent: *Sep. 7, 1999

[54] COMFORT NOISE GENERATOR FOR ECHO CANCELERS

[75] Inventors: Sanjay Gupta; Prabhat K. Gupta, both of Germantown; Bob Kepley, Gaithersburg, all of Md.

[73] Assignee: Hughes Electronics Corporaton, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/529,232

[22] Filed: Sep. 15, 1995

[51] Int. Cl.$^6$ ....................................................... H04B 3/20
[52] U.S. Cl. ............................ 381/66; 704/228; 379/406
[58] Field of Search ........................... 381/66, 71.1, 94.1, 381/94.4, 94.5, 94.7, 91.1; 379/406, 410, 411, 412, 388, 389, 390; 704/228, 227, 226

[56] References Cited

U.S. PATENT DOCUMENTS

| | | |
|---|---|---|
| 3,991,287 | 11/1976 | May, Jr. et al. ........................ 379/406 |
| 4,166,924 | 9/1979 | Berkley et al. ............................. 381/66 |
| 4,192,979 | 3/1980 | Jankowski, Jr. ........................... 381/66 |
| 4,215,252 | 7/1980 | Onufry, Jr. ................................. 381/66 |
| 5,157,653 | 10/1992 | Genter ...................................... 379/410 |
| 5,274,705 | 12/1993 | Younce et al. ........................... 379/410 |
| 5,537,509 | 7/1996 | Swaminathan et al. ................ 395/2.37 |

Primary Examiner—Vivian Chang
Attorney, Agent, or Firm—John T. Whelan; Michael W. Sales

[57] ABSTRACT

The invention describes a method and device of comfort noise generation for echo cancelers. The invention stores the actual background noise of a channel in a noise buffer. When the echo suppressor is activated by the echo canceler to suppress any unwanted signals on the channel, the buffer provides the stored noise to the channel to provide continuous background noise. To ensure that neither speech nor impulse noise enters the buffer, hangover delays and energy threshold levels are provided such that signals within the delay period or signals which exceed the energy threshold level are screened from entering the buffer.

26 Claims, 2 Drawing Sheets

COMFORT NOISE GENERATOR FOR ECHO CANCELERS

BACKGROUND OF THE INVENTION

The present invention relates generally to echo cancelers, and more particularly to comfort noise generation for use with echo cancelers.

A communication channel generally has a near-end which transmits signals to a far-end. To prevent delayed or reflected far-end signals from interfering with a near-end listener, echo cancelers attempt to cancel any extraneous signals present on a channel. Because echo cancelers cannot ordinarily cancel all the unwanted signals on a channel, they also employ a center-clipping echo suppressor to suppress any residual echo on the channel.

Echo suppressors ordinarily operate by clipping portions of its output signal to zero. Many echo cancelers, however, do not insert any noise to replace the zero clipping of the echo suppressor. The result is a channel that suddenly sounds "dead" whenever the suppressor is active. To a far-end listener, these sudden variations in the noise level on the channel causes a choppy effect which impedes normal conversation. The zero clipping of the echo suppressor also causes a non-linear effect for vocoders which also degrades their performance. The sudden transition in levels introduces high frequency components into the signal which the vocoders cannot handle.

Some echo cancelers do employ a noise replacement technique in an attempt compensate for the effects of echo suppressors. Noise of either a fixed spectral shape (white or pink), or estimated spectral shape is inserted when the center-clipping echo suppressor is active. These techniques, however, also cause perceptible variations in the noise characteristics on the channel. The predetermined background noises, however, cannot accurately match the actual background noise which accordingly disturbs the listener. The effect becomes even more pronounced and objectionable when network delays are present, such as in satellite communication networks.

Therefore, there is a need for noise generation for use in echo cancelers to provide constant and continuous background noise to avoid perceptible variations in the noise characteristics on the channel.

SUMMARY OF THE INVENTION

The present invention provides a method of comfort noise generation for residual echo suppressors used with echo cancelers.

The present invention preferably includes a method of storing the actual background noise on the channel in a buffer. Generally, when the echo suppressor is activated by the echo canceler to suppress any residual echo, the actual noise stored in the buffer is played back to provide a continuous background noise on the channel.

The present invention preferably includes a noise delay buffer. The noise delay buffer ensures that speech or impulse noise does not enter the buffer as background noise. This aspect of the invention includes initially storing the near-end noise samples in a circular delay buffer. To ensure that neither speech nor impulse noise enters the buffer, hangover delays and energy threshold levels are provided. Signal levels within the hangover delay period or exceeding the energy threshold levels are thus screened from entering the noise delay buffer.

The invention preferably includes a noise output buffer to provide the stored background noise to the channel when the echo suppressor is activated. The output buffer preferably receives stored noise samples from the noise delay buffer for output to the channel. Preferably, the noise output buffer is long enough such that noise being continually replayed from the output buffer does not sound repetitive.

Thus, the present invention provides improved performance of a comfort noise generation system for residual echo suppressors used in echo cancelers.

It is to be understood that both the foregoing general description and the following detailed description are exemplary and explanatory and are intended to provide further explanation of the invention as claimed. The invention, together with further objects and attendant advantages, will best be understood by reference to the following detailed description, taken in conjunction with the accompanying drawings.

DETAILED DESCRIPTION OF THE PRESENTLY PREFERRED EMBODIMENT

Figure 1:
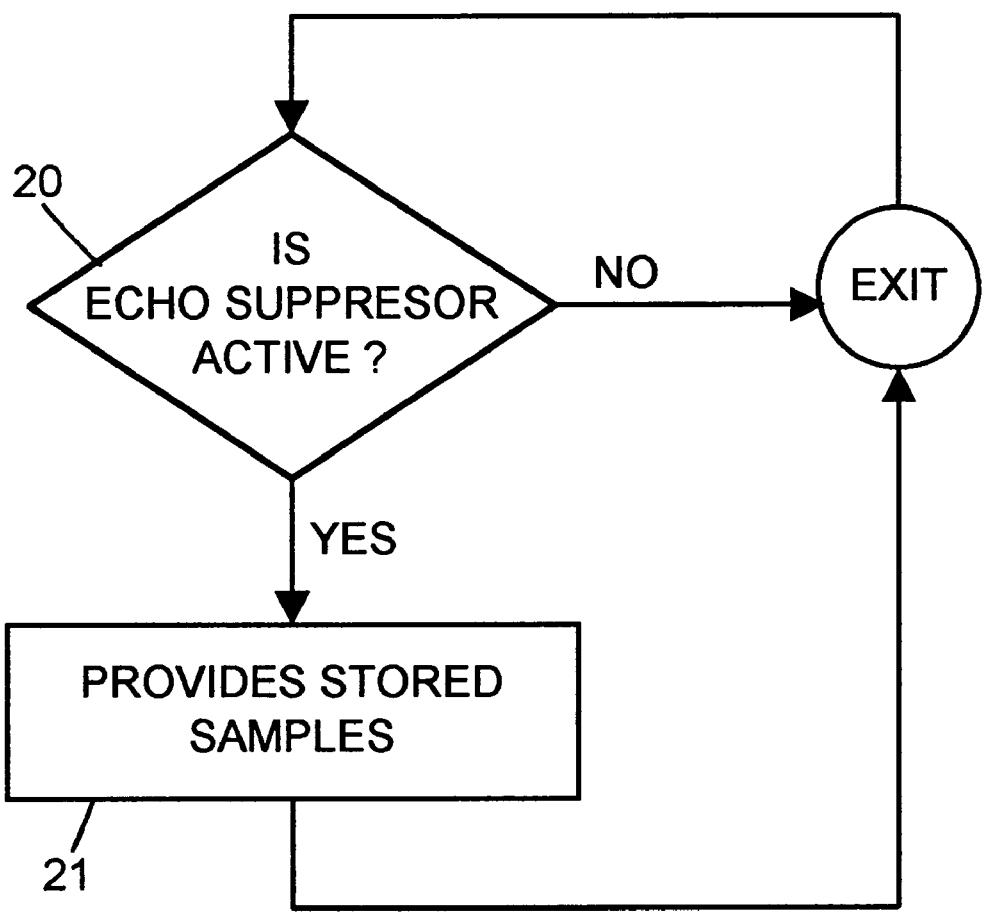
FIG. 1 shows a flow diagram of the activation of the comfort noise generator of the present invention.

Referring now to the drawings, FIG. 1 shows the activation of the comfort noise generator. If the echo suppressor is active 20, the comfort noise generator of the present invention provides the stored background noise to the channel 21. The comfort noise generator of the present invention can generally used with echo suppressors well known to those skilled in the art.

Figure 2:
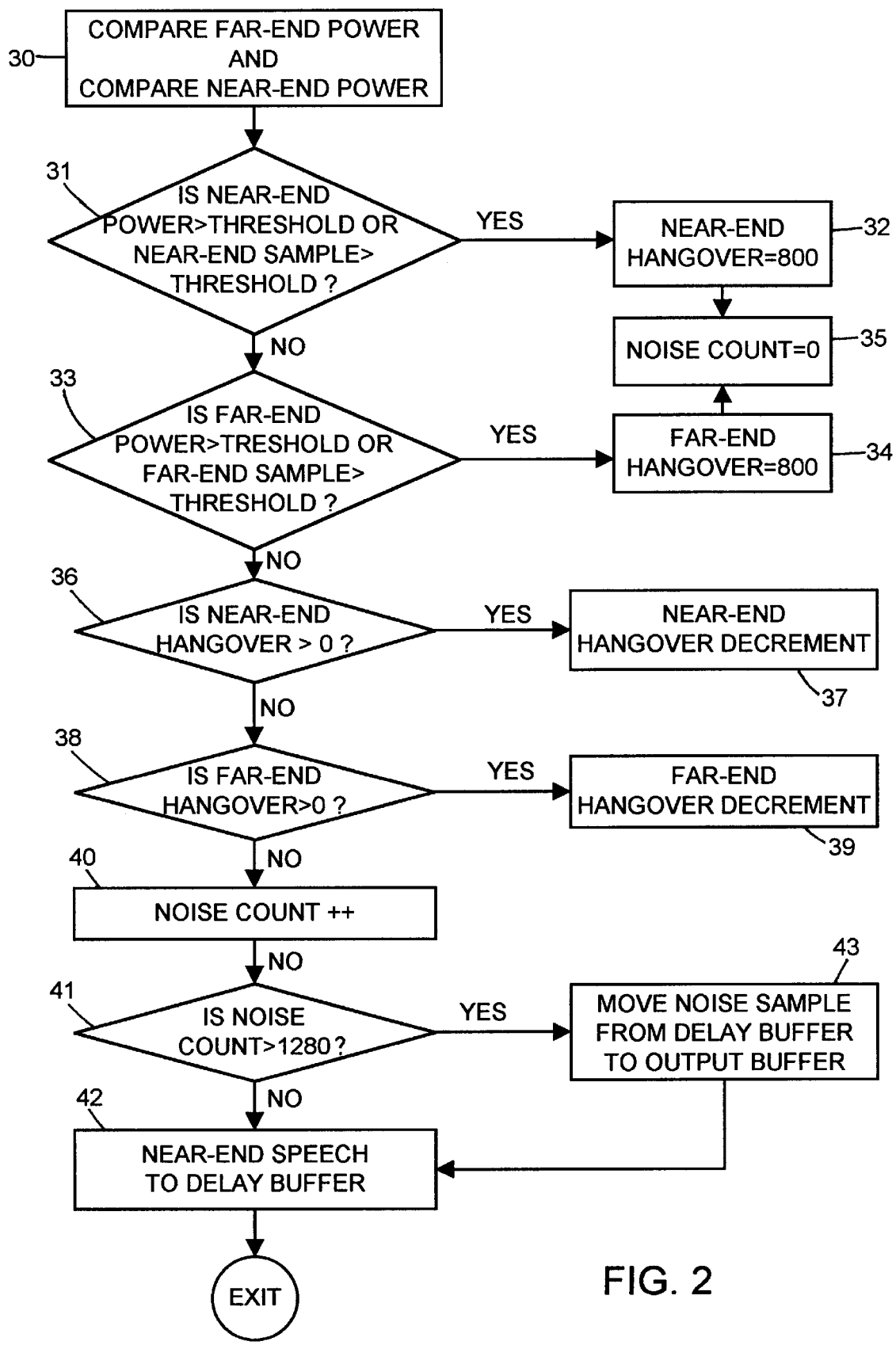
FIG. 2 shows a flow diagram of the comfort noise generator of FIG. 1.

As shown in FIG. 2, the comfort noise generator first computes the power level of the near and far-ends 30. Preferably the near and far-ends are sampled at 8 KHz. The computed power level is preferably a running average of the energy level of the last 32 samples at the 8 KHz sampling rate.

The computed near-end power level and current near-end sample power value are then compared to threshold values 31. If the computed near-end power level or the current near-end sample exceeds a threshold level, the near-end hangover count is reset 32. Preferably, the near-end power threshold is set to a value of 50, which corresponds to an energy level of −38 dBm0, and the near-end sample threshold is set to a value 100, which corresponds to −32 dBm0. The near-end hangover count is preferably reset to a count of 800, which corresponds to a time of 100 msecs at the 8 KHz sample rate. Of course, other sample rates and threshold values may be used depending on the particular network.

If the near-end power and sample levels are below the desired thresholds, the far-end power level and the current far-end sample are compared to threshold values 33 similar to the near-end comparison 31. If the far-end power level or the far-end sample exceeds a threshold level, the far-end hangover count is reset 34. Like the near-end 31, the far-end power threshold is preferably set to 50, which corresponds to an energy level of −38 dBm0 and the far-end sample threshold is set to 100, which again corresponds to −32 dBm0. The far-end hangover count is also preferably reset to a count of 800, corresponding to a time of 100 msecs at the 8 KHz sample rate.

If either the near or far-end hangover count is reset, the noise count is also reset to a zero value 35.

If both near and far-ends are both below the threshold values 31, 33, the near and far-end hangover counts 36, 38 are checked. If the near-end hangover count is non-zero 36, it is preferably decremented 37. Similarly, if the far-end hangover count is non-zero 38, it is preferably decremented 39.

If the both near and far-end hangover counts are zero, however, the channel contains only background noise. The background noise can be then stored in the buffer to be provided to the channel when the echo suppressor is active. The noise count is first incremented 40 and compared 41 to a count of 1280, a value corresponding to 320 msecs.

Initially the noise count will not exceed 1280, so the actual background noise sample will be placed into a delay noise buffer 42 to insure than no speech or impulse noise is sent to the output of the comfort noise generator. Preferably, the near-end sample is stored in a circular delay buffer. The noise delay buffer is preferably large enough to hold 320 msecs of noise. At an 8 KHz sample rate, for example, the noise delay buffer must hold 1280 or preferably 2560 samples.

If the noise count exceeds 2560, the noise delay buffer is full. Samples from the noise delay buffer, delayed 320 msec, can are then sent to the output buffer. The output buffer provides the channel the stored background noise during activation of the echo suppressor 20, 21 (FIG. 1).

Preferably, the output buffer is long enough such that repeated output of the buffer does not sound repetitive to a listener. Preferably, the output buffer holds 1 second of background samples. To avoid excessive use of memory, the noise samples are limited to 8-bits, allowing an upper threshold of 30 dBm0. At an 8-KHz sample rate, 8000 8-bit samples are therefore required. Using 32-bit memory chips, 2000 bytes are thus required. A buffer of this size has been determined to be of adequate length such that when the content of the buffer is repetitively played for the duration of the echo suppression, there is no perceptible difference on the background noise characteristics.

Of course, it should be understood that a wide range of changes and modifications can be made to the preferred embodiment of the invention described above. Different thresholds, sample rates and buffer sizes will be used by those skilled in the art depending on the characteristics of the particular network. Other embodiments may chose to omit the noise delay buffer. It is therefore intended that it is the following claims, including all equivalents that is intended to define the scope of the invention.

We claim:

1. A method of providing a comfort noise generator for use with echo suppressors comprising the steps of:

storing actual background noise samples of a channel into a delay buffer;

transferring said actual background noise samples from said delay buffer to an output buffer after a delay period during which said delay buffer receives only background noise; and providing said background noise onto said channel from said output buffer when said echo suppressor is active.

2. The method of claim 1, whereby said output buffer holds 1 second of stored background noise.

3. The method of claim 1 whereby said background noise is stored as an 8-bit digital value.

4. The method of claim 1 whereby said background noise is sampled at an 8 KHz rate.

5. The method of claim 1 whereby said output buffer holds 8000 samples of said background noise.

6. The method of claim 1 further comprising the steps of:

computing a power level for the near-end and far end signal; and comparing the computed power level to a first threshold level; and comparing the current instantaneous power level to a second threshold level.

7. The method of claim 6 whereby the computed power level is the average power of the signal over a 4 msecs time period.

8. The method of claim 6 whereby the first threshold level is equal to a value of −38 dBm0.

9. The method of claim 6 whereby the second threshold level is equal to a value of −32 dBm0.

10. A device for providing a continuous background noise comprising:

a noise delay buffer for storing an actual background noise of a channel; and an output buffer for outputting said stored actual background noise from said delay buffer into said channel;

wherein said stored actual background noise is transferred from said noise delay buffer to said output buffer after said noise delay buffer receives only background noise for a predetermined delay period.

11. The device of claim 10 whereby said output buffer stores 1 second of background noise.

12. The device of claim 10 where the noise delay buffer and the output buffer store backgrond noise at a 8 KHz sample rate.

13. The device of claim 10 further comprising:

a comparator for comparing a computed power level to a first threshold level, and comparing a sample power level to a second threshold level.

14. The device of claim 13 where the first threshold level is equal to −32 dBm0.

15. The device of claim 13 whereby the second threshold level is equal to a value −38 dBm0.

16. A method of providing a comfort noise generator for use with echo suppressors to generate comfort noise on a channel, comprising the steps of:

comparing a signal energy level of a signal sample to a threshold energy level;

checking a hangover delay counter for a hangover duration;

increasing a noise counter if said hangover delay counter indicates said hangover duration is exceeded and if said signal energy level is less than said threshold energy level;

storing signal samples in a first buffer if said noise counter is increased;

transferring said signal samples from said first buffer to a second buffer when said noise counter exceeds a threshold noise count; and outputting said signal samples from the second buffer onto said channel if said echo suppressor is active.

17. The method of claim 16 whereby the channel energy level comparison step further comprises the steps of:

comparing a near end energy level to a near end threshold energy level;

comparing a far end energy level to a far end threshold energy level;

resetting a near end hangover counter if the near end energy level is greater than the near end threshold energy level;

resetting a far end hangover counter if the far end energy level is greater than the far end threshold energy level; and resetting the noise counter if the near end energy level is greater than the near end threshold energy level or if the far end energy level is greater than the far end threshold energy level.

18. The method of claim 16 wherein the step of storing the actual background noise further comprises the steps of:

comparing the noise counter to a threshold noise count;

moving the actual background noise to a first buffer, the first buffer containing a plurality of actual background noise samples; and moving the actual background noise samples from the first buffer to a second buffer if the noise counter exceeds the threshold noise count.

19. A device for generating comfort noise on a channel during echo suppression by an echo suppressor, wherein the comfort noise is actual background noise from the channel that is stored by said device, said device comprising:

a comparator adapted to determine that a signal sample on said channel is a background noise samples; and a first buffer adapted to store signal samples from said comparator that are determined to be background noise samples; and a second buffer adapted to store background noise samples from said first buffer and to output said stored background noise samples to said channel when said echo suppressor is active;

wherein said first buffer transfers background noise samples to the second buffer after a predetermined number of consecutive signal samples are determined by said comparator to be background noise samples.

20. A device for generating comfort noise according to claim 19 wherein said comparator is adapted to determine that a signal sample is not a background noise sample if a far-end signal power is greater than a far-end signal power threshold.

21. A device for generating comfort noise according to claim 19 wherein said comparator is adapted to determine that a signal sample is not a background noise sample if a near-end signal power is greater than a near-end signal power threshold.

22. A device for generating comfort noise according to claim 19 wherein said comparator is adapted to determine that a signal sample is not a background noise sample if a predetermined hangover period has not elapsed since near-end speech was transmitted on said channel and since far-end speech was transmitted on said channel.

23. A method for generating comfort noise on a channel during echo suppression by an echo suppressor, wherein said comfort noise is actual background noise from said channel that is stored by said device, said method comprising the steps of:

determining that signal samples on said channel are background noise samples;

storing said signal samples in a first buffer if said signal samples are determined to be background noise samples;

transferring background noise samples from said first buffer to a second buffer after a predetermined number of consecutive signal samples are determined to be background noise samples;

outputting stored background noise samples from said second buffer to said channel when said echo suppressor is active.

24. A method for generating comfort noise according to claim 23 wherein said determining step comprises the step of determining that a signal sample is not a background noise sample if a far-end signal power is greater than a far-end signal power threshold.

25. A method for generating comfort noise according to claim 23 wherein said determining step comprises the step of determining that a signal sample is not a background noise sample if a near-end signal power is greater than a near-end signal power threshold.

26. A method for generating comfort noise according to claim 23 wherein said determining step comprises the step of determining that a signal sample is not a background noise sample if a predetermined hangover period has not elapsed since near-end speech was transmitted on said channel and since far-end speech was transmitted on said channel.

* * * * *